(12) United States Patent
Sun (10) Patent No.: US 6,816,307 B1
(45) Date of Patent: Nov. 9, 2004

(54) LARGE SIZED REAR PROJECTION SCREEN

(76) Inventor: Bolin Sun, No. 256, Fukang Road, Xinpu District, Lianyungang City, Jiangsu Province 222004 (CN)

( * ) Notice: Subject to any disclaimer, the term of this patent is extended or adjusted under 35 U.S.C. 154(b) by 0 days.

(21) Appl. No.: 10/399,532

(22) PCT Filed: Oct. 18, 2000

(86) PCT No.: PCT/CN00/00338

§ 371 (c)(1),
(2), (4) Date: Dec. 18, 2003

(87) PCT Pub. No.: WO01/29614

PCT Pub. Date: Apr. 26, 2001

(30) Foreign Application Priority Data

Oct. 18, 1999 (CN) .......................................... 99121820

(51) Int. Cl.[7] ........................ G03B 21/60; G02B 27/10
(52) U.S. Cl. ....................... 359/457; 359/619; 359/621
(58) Field of Search ............................... 359/621, 455, 359/456, 457, 619

(56) References Cited

U.S. PATENT DOCUMENTS

| | | | |
|---|---|---|---|
| 4,573,764 A | | 3/1986 | Bradley |
| 4,647,519 A | * | 3/1987 | Speigel ........................ 359/456 |
| 4,701,020 A | * | 10/1987 | Bradley, Jr. ................. 359/457 |
| 4,725,134 A | | 2/1988 | Ogino |
| 5,121,252 A | * | 6/1992 | Okada et al. ................ 359/455 |
| 5,206,761 A | | 4/1993 | Ogino |
| 5,296,922 A | | 3/1994 | Mitani et al. |
| 5,708,528 A | * | 1/1998 | Furuya ........................ 359/457 |
| 5,889,612 A | | 3/1999 | Van De Ven |
| 6,172,814 B1 | * | 1/2001 | Watanabe et al. ........... 359/619 |
| 6,407,859 B1 | * | 6/2002 | Hennen et al. ............. 359/457 |
| 6,621,637 B2 | * | 9/2003 | Uchiyama et al. .......... 359/619 |

FOREIGN PATENT DOCUMENTS

| | | |
|---|---|---|
| EP | 0154053 | 9/1985 |
| EP | 0361917 | 4/1990 |
| EP | 0816910 | 7/1998 |
| JP | 8122922 | 5/1996 |
| JP | 10026803 | 1/1998 |
| JP | 8227106 | 9/1998 |
| JP | 2000089267 | 3/2000 |

* cited by examiner

Primary Examiner—Christopher E Mahoney
(74) Attorney, Agent, or Firm—D. Peter Hochberg; Sean Mellino; Katherine R. Vieyra (57) ABSTRACT

A rear projection screen does not block the image light and provides a perfect complete image. The screen includes a Fresnel lens, and a cylindrical lens array consisting of a plurality of cylindrical lens elements. These elements are independent from each other and in parallel, and arranged closely between adjacent cylindrical lens element, so that there are no luminous flux loss therebetween. A strengthening area, which is provided with a rigid reinforced member connecting with cylindrical lens elements on two sides thereof, is formed on the are a being from their contact portion to the image-light exist-side surface between adjacent cylindrical lens elements. An ambient light absorbing portion is formed at the image-light exit side in the strengthening area.

16 Claims, 15 Drawing Sheets

LARGE SIZED REAR PROJECTION SCREEN

CROSS REFERENCE TO RELATED APPLICATIONS

This application is the U.S. National Stage application of international application number PCT/CN00/00338 filed on Oct. 18, 2000.

FIELD OF THE INVENTION

The present invention relates to a rear projection screen, more particularly to large sized rear projection screen.

BACK GROUND OF THE INVENTION

The existing rear projection screen of prior art includes a Fresnel lens for collecting the image incident light, and a cylindrical lens array for receiving the image light collected by the said Fresnel lens, an ambient light absorbing portion and a image light effluence portion formed at the image-light exit side. As to the small sized screen for rear projection TV set, the cylindrical lens array in the screen can be manufactured by the integrated mold due to the size of the mold is small. But for the larger sized rear projection screen, such as more than 150 inches, if the cylindrical lens array in the screen still is made by the integrated mold, then the cost for the mold will be very high, that is, it is infeasible in view of economic point. Therefore, a large sized rear projection screen is normally formed by assembling a plurality of small rear projection screen. For example, a patent No. JP 1998-260478 disclosed an assembled large sized rear projection screen, which includes a plurality of unit screen in the horizontal and longitudinal direction, the sidepiece of each unit screen are fixed with the shade at the back side by screws. The screws are positioned at the inner side of the sidepiece of each unit screen instead of at the seam between two adjacent unit screens, result that the adjacent unit screens can be joint tightly almost without black strip shade lights. But there are still lots of image shading black spots at the position where the screws are fixed at the sidepiece of each unit screen, and the size of the image shading black spots are much larger than the ones of the pixels which form images. Accordingly the integrity and continuity of images are damaged.

SUMMARY OF THE INVENTION

The object of the present invention is to provide a large sized rear projection screen, wherein there is not any shade for the images projected from rear, accordingly to provide with complete images without any defects.

The object of the present invention can be realized by the following large sized rear projection screen, which includes:

a Fresnel lens for collecting the image incident light, a cylindrical lens array for receiving the image light collected by the said Fresnel lens, and an ambient light absorbing portion and a image light effluence portion formed at the image-light exit side;

wherein the said cylindrical lens array comprises of a plurality of cylindrical lens elements, these cylindrical lens elements are separated from each other, that is independent, and in parallel, and arranged closely between adjacent cylindrical lens element, so that there are no luminous flux loss therebetween. A strengthening area, which is provided with a rigid reinforced member connecting with cylindrical lens elements on two sides thereof, is formed on the area being from their contact portion to the image-light exist-side surface between adjacent cylindrical lens elements. An ambient light absorbing portion is formed on the image-light exit side in the strengthening area.

With respect to the large sized rear projection screen with the above mentioned structure, as a strengthening area is formed in the cylindrical lens array which is made as outer side of the screen and reinforced members are formed within the strengthening area, so the impact strength, bending strength and rigidity of the full screen are improved, and the cylindrical lens will not deformed. In addition, since the said strengthening area is located in the area where no luminous flux loss is generated, and the strengthening area dose not shade any light projected from rear side, the images shown on the full screen possess the integrity and continuity without shadow or black spots caused by fixing screws of those prior art And the large sized rear projection screen of the present invention furthermore dose not have the wide striped shadows which possessed by the market available large sized screen assembled by multi-screen unit with sidepieces. As all strengthening area are located in the area where no luminous flux loss is generated and all strengthening area are provided with ambient light absorbing portion, so the ambient light absorbing portion of the complete screen according to this invention, i.e. the portion of the black grounding, is much higher than the ones of the conventional rear projection screen. Furthermore, due to the cylindrical lens array of the screen of present invention consist of a plurality of elements, i.e. breaking up the whole into parts, the process of manufacture is simple, the expensive huge mold for the conventional integrated rear projection screen is not required according to this invention.

In the said rear projection screen, each cylindrical lens elements can be formed by many integrated basic cylindrical lenses whose axial plane keep in parallel.

As to the large sized rear projection screen, since each cylindrical lens elements possesses many integrated basic cylindrical lenses, the number of the element decreases, the efficiency of assembling increases, the production cost of the screen can be reduced while the optical performance is not lost In the said rear projection screen, each cylindrical lens elements may comprises single basic cylindrical lens.

As to the large sized rear projection screen of this invention, each cylindrical lens element is formed by many integrated basic cylindrical lenses, so that strengthening area can be formed between the single basic cylindrical lenses with rigid reinforced members provided therein, accordingly the rigidity of the whole screen is improved. In addition, the ambient light absorbing portions which are provided between basic cylindrical lenses are made of the same material, so the effect of light absorbing in the whole screen may remain consistent In the rear projection screen of this invention, those cylindrical lens elements can be assembled with two kinds of cylindrical lens elements. The first kind of cylindrical lens elements are formed by many integrated basic cylindrical lenses whose axial plane keep in parallel, the second kind of cylindrical lens elements are formed by single basic cylindrical lenses.

In the rear projection screen of this invention, the first and second kind of cylindrical lens elements can be arranged in the manner that one or more first kind of cylindrical lens element(s) is/ are provided between two the second kind of cylindrical lens elements.

In the rear projection screen of this invention, the first and second kind of cylindrical lens elements can be arranged in the manner that one or more the second kind of cylindrical lens element(s) is/ are provided between two the first kind of cylindrical lens elements.

In the rear projection screen of this invention, the rigid reinforced members can be the shape of "Y" or "T", wherein the two front wings are positioned at the image-light exit side. The screen is provided with a outer frame which is connected with the two ends of the reinforced members.

In the rear projection screen of this invention, the cross section of the reinforced members can be of polygonal wherein one of angles protrudes toward the direction of image-light exiting.

As to the large sized rear projection screen of this invention, since the front portion of the reinforced members projects toward out side, the contact between the cylindrical lenses and environmental objects can be avoided to prevent the cylindrical lens from abrading and damaging.

In the rear projection screen of this invention, the reinforced members can be made from rigid materials. At the out side of the reinforced members, i.e. the image-light exit side, a black oxide layer or black overcoating layer is provided.

In the rear projection screen of this invention, the rigid material can be metal, carbon fiber or non-metal material with high rigidity, wherein the metal can be light metal, for example aluminum alloy.

If the reinforced members adopt aluminum alloy, the weight of the screen can be reduced with sufficient mechanical strength ensured.

The reinforced members and the corresponding cylindrical lenses of both sides can be jointed by engaging a tenon with a mortice.

As to the large sized rear projection screen of this invention, the contacting area between the reinforced members and the adjacent cylindrical lens elements can be enlarged to ensure the sufficient joint strength therebetween and to increase the surface area of the ambient light absorbing portion.

The reinforced members and the corresponding cylindrical lenses of both sides can be jointed by bond.

The ambient light absorbing portion in the strengthening area can be formed by black reinforced members themselves which absorb the ambient light.

As to the large sized rear projection screen of this invention, since the reinforced members themselves can be light absorbed black parts, then it may function the rigidity improving and ambient light absorbing to simplify the process of screen manufacturing. Furthermore, unlike the ambient light absorbing portion of those conventional screen with stuck black band or coated black layer, light absorbing effect of the ambient light absorbing portion of this invention will not be easily reduced by abrading or damaging.

The ambient light absorbing portion of the strengthening area can be made from light absorbing packing which stuff the area.

The Fresnel lens of this invention is made of two overlapped lenses with straight Fresnel stripes, and the direction of the straight Fresnel stripes of the two lenses keep at right angles each other.

The large sized rear projection screen of this invention facilitates the manufacturing of the Fresnel lens to reduce the relevant production cost.

The ambient light absorbing portions are also provided at the sides adjacent to cylindrical lens elements of both sides in the strengthening area.

As to the large sized rear projection screen of this invention, the ambient light absorbing portions are also provided at the other sides except the front side, i.e. the image-light exit side, so that the diffusion lights which are projected into the inner of the cylindrical lens through image light diffused transmission part of the cylindrical lens can be massively absorbed, accordingly the portion of the black grounding of the complete screen is increased substantially.

The large sized rear projection screen of this invention can be used on the large screen in TV studio, air port and train stations, the large sized active image advertising in main streets, the large sized image monitoring system of industrial control (such as power plant, steelworks and chemical plant), monitoring system of military commanding, analog campaign system, auditorium, meeting room, the large sized screen in multi-functional hall, teaching room, entertainment place, and cinema etc.

DETAIL DESCRIPTION OF THE PREFERRED EMBODIMENT OF THE PRESENT INVENTION

Figure 1:
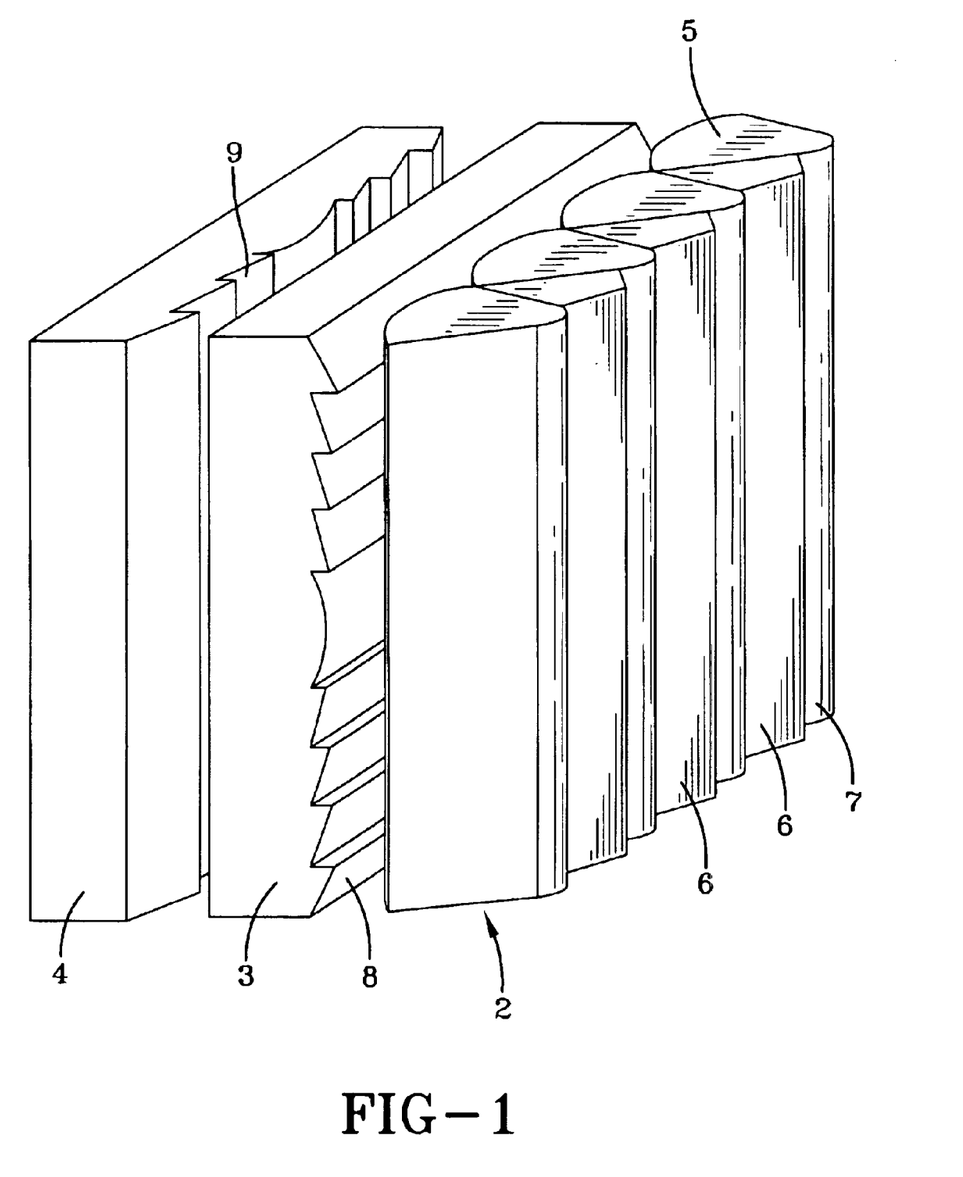
FIG. 1 is a perspective illustrated an embodiment of the large sized rear projection screen according to the present invention.

FIG. 1, which is an embodiment of the large sized rear projection screen according to the present invention, the screen includes a Fresnel lens 4 for collecting the image incident light, and a Fresnel lens 3 for collecting the light from Fresnel lens 4, the Fresnel lens 3 and 4 overlap each other, and the direction of the corresponding straight Fresnel stripes 8 and 9 of the two lenses 3 and 4 keep at right angles each other. In addition the screen also includes a cylindrical lens array 2 for receiving the image light collected by the said Fresnel lenses, and ambient light absorbing portions and image light diffused transmission part are formed at the exit side.

Figure 2:
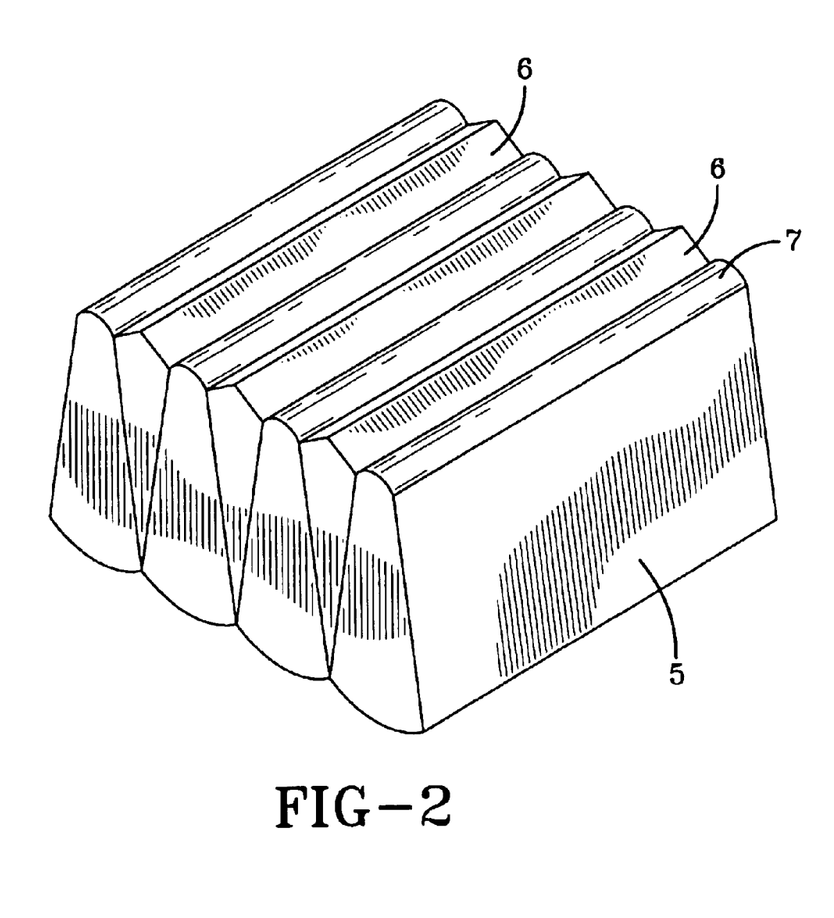
FIG. 2 is a perspective illustrated the cylindrical lens array of the screen shown in FIG. 1.
Figure 3:
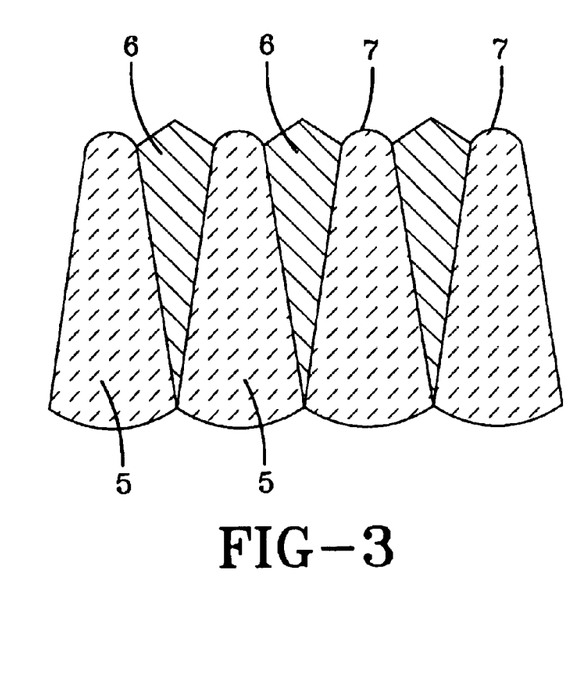
FIG. 3 is a section view of the cylindrical lens array shown in FIG. 2.
Figure 4:
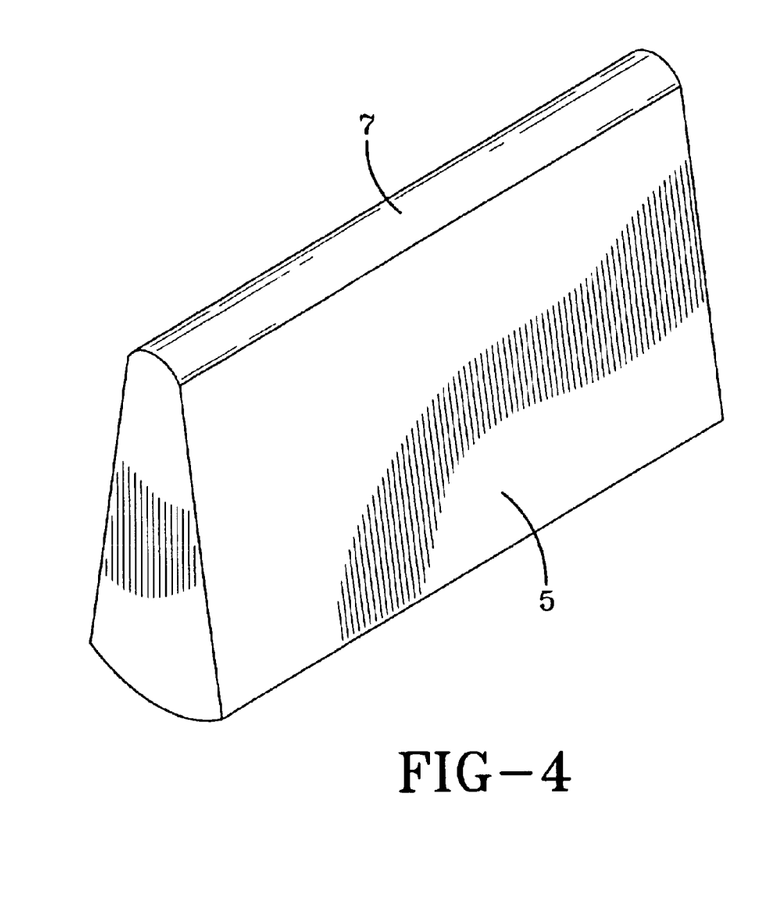
FIG. 4 is a perspective of basic cylindrical lens of the cylindrical lens array shown in FIG. 3.
Figure 5:
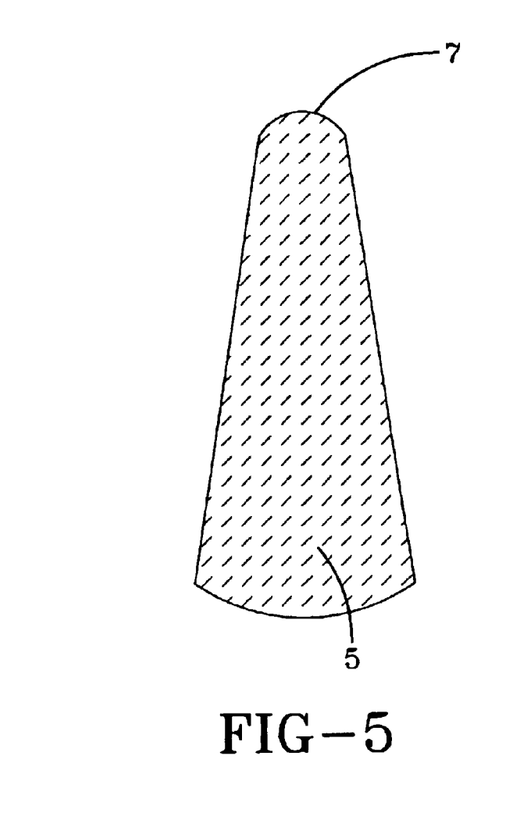
FIG. 5 is a section view of the basic cylindrical lens shown in FIG. 4.

As shown in FIGS. 1–3, the cylindrical lens array 2 consist of a plurality of cylindrical lens elements 5, each cylindrical lens elements 5 is formed by only one basic cylindrical lens. As shown in FIGS. 3 and 4, image light diffused transmission part 7 is formed at the image light exit side, the adjacent basic cylindrical lenses 5 keep in parallel and are arranged closely, so that there are no luminous flux loss on the image incident light therebetween. The strengthening area are formed in the space of the sides of the adjacent basic cylindrical lenses 5 for the purpose of improving the mechanical strength of the screen, such as bending strength, impact strength etc., and the strengthening area does not shade the image incident light.

Figure 6:
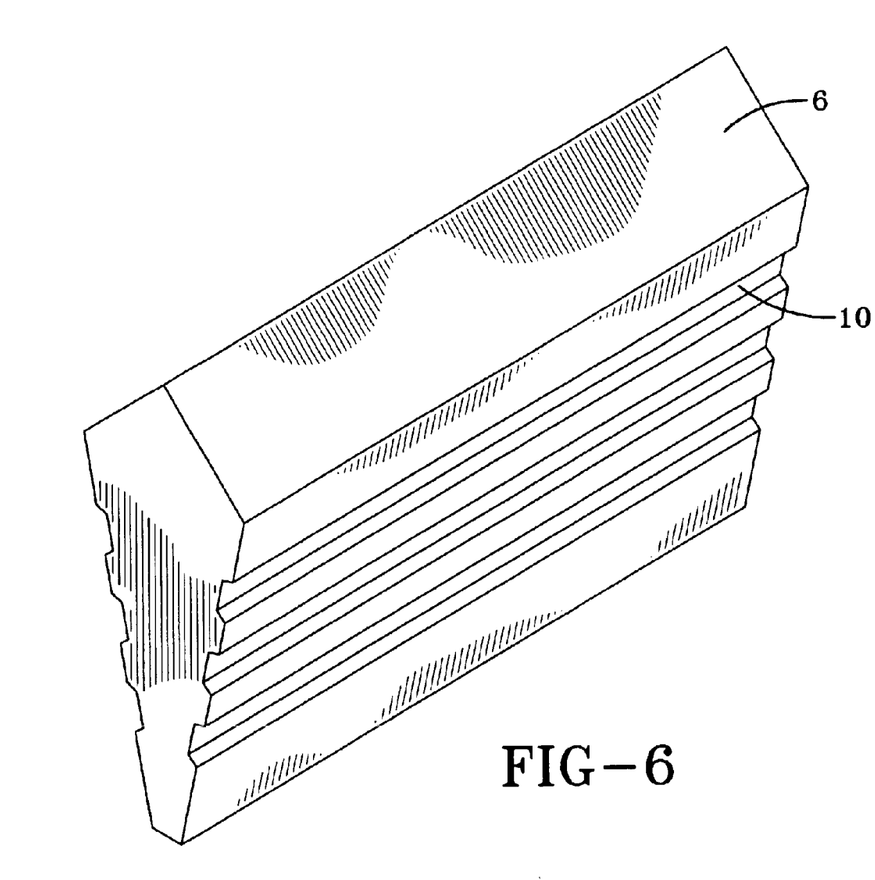
FIG. 6 is a perspective of the reinforced member of the cylindrical lens array shown in FIG. 3.
Figure 7:
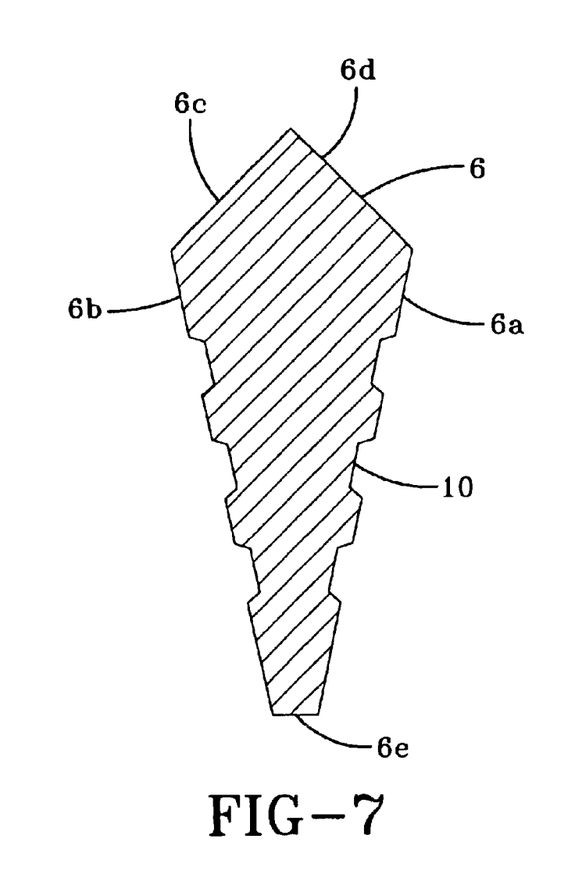
FIG. 7 is a section view of the reinforced member shown in FIG. 6.

As shown in FIGS. 6 and 7, a rigid reinforced member 6 is provided in each strengthening area, for example the rigid reinforced member can be of batten of aluminum alloy, and the cross section of each batten shaped rigid reinforced member 6 take the shape of polygon, which includes two inclined planes 6c and 6d positioned at the front part (i.e. outside), two inclined side planes 6a and 6b, a back plane 6e positioned at the back side, and several concave portions 10 provided in the two inclined side planes 6a and 6b, wherein a black oxide layer or black overcoating layer is formed on the said inclined planes 6c and 6d and the inclined side planes 6a and 6b to absorb ambient light. With respect to the screen with the small sized basic cylindrical lenses, the concave portions 10 cause the surface of the inclined side planes 6a and 6b to be rough. Therefore the friction force and the bonding area are enlarged with respect to the super large sized screen, the geometry size of the basic cylindrical lenses are large, so protruding can be made on the corresponding side face of the adjacent basic cylindrical lenses, accordingly the structure of engaging tenon with mortice can be formed during assembling to ensure a tight joint between both parts. A black bond can be filled into the concave 10, according to the said structure, the reinforced member 6 can absorb ambient light and the effect of improving mechanical strength of the screen can be achieved. At the same time, the image light from the Fresnel lens will not be shaded, to provide the image shown by the screen with integrity and continuity.

Figure 8:
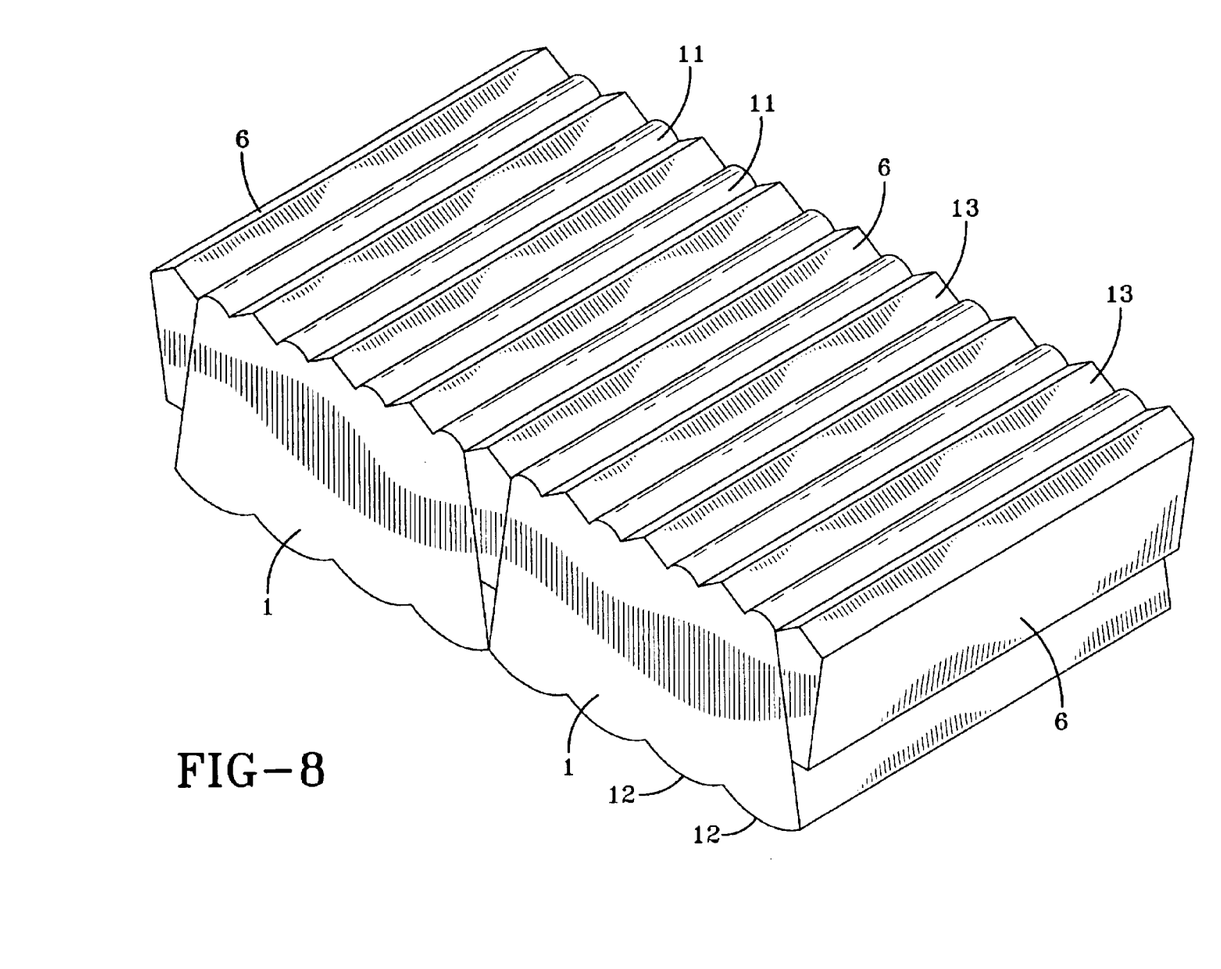
FIG. 8 is a perspective of another embodiment of cylindrical lens array which constitute the large sized rear projection screen of this invention.
Figure 9:
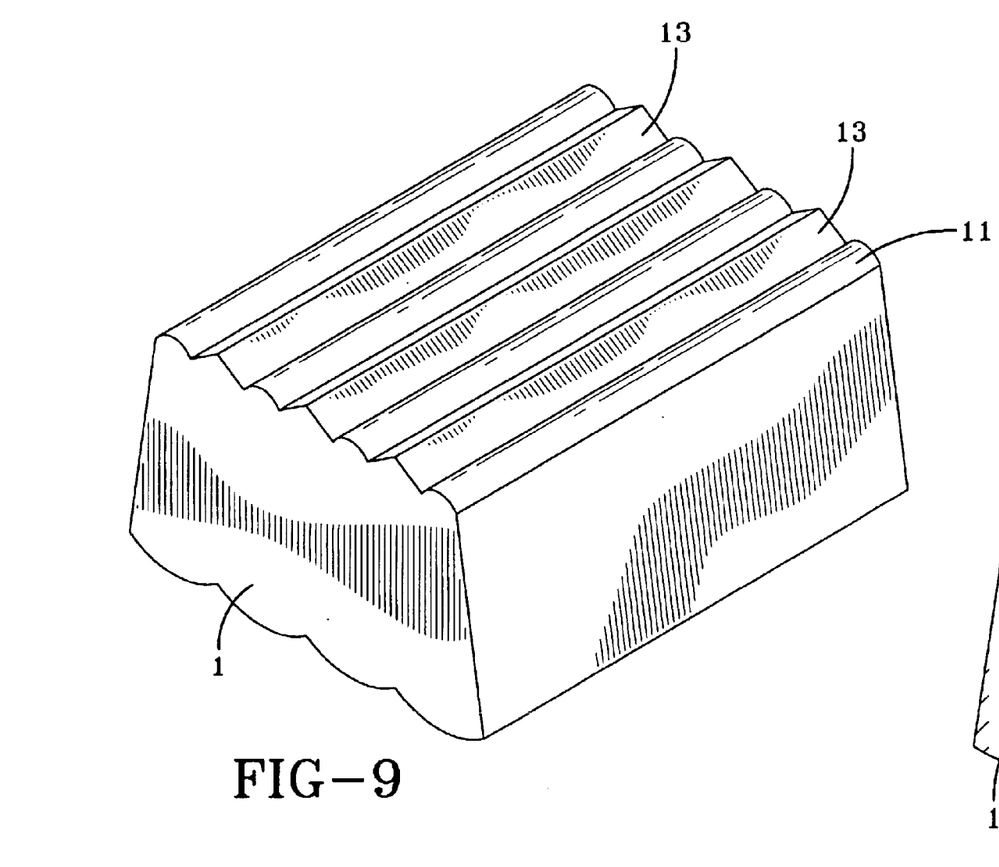
FIG. 9 is a perspective of the cylindrical lens elements which constitute the cylindrical lens array shown in FIG. 8.
Figure 10:
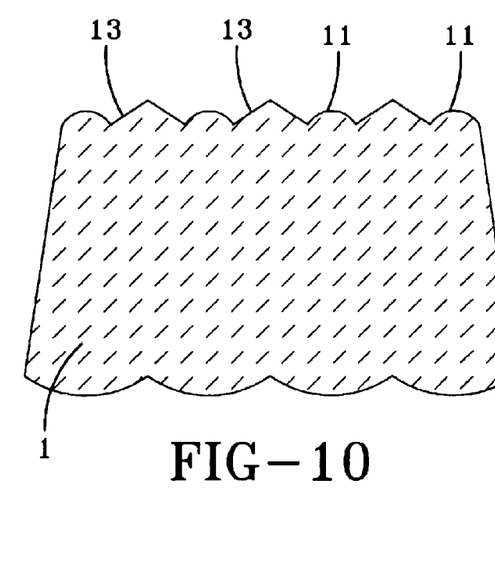
FIG. 10 is a section view of the cylindrical lens elements shown in FIG. 9.

As shown in FIGS. 8, 9 and 10, as another embodiment of large sized rear projection screen according to the present invention, the cylindrical lens array of the screen consists of a plurality of cylindrical lens element 1, the adjacent cylindrical lens elements 1 keep in parallel and are arranged closely. Therefore, there are no luminous flux loss therebetween. A strengthening area is provided therebetween, and the strengthening area is formed by reinforced member 6 as shown in FIGS. 6 and 7, each reinforced member 6 can connect the adjacent cylindrical lens elements 1 by bond. Each cylindrical lens elements 1 is formed by multi integrated basic cylindrical lens 12. Image light diffused transmission part 11 is provided at the light transmission side of each basic cylindrical lens 12, and ambient light absorbing portions 13 are provided between the image light diffused transmission parts 11 of the adjacent basic cylindrical lenses 12. The cylindrical lens array in this embodiment can replace the one of the screen shown in FIG. 1 and 2 to form a rear projection screen together with two overlapped Fresnel lenses 3 and 4 at the back side.

Figure 11:
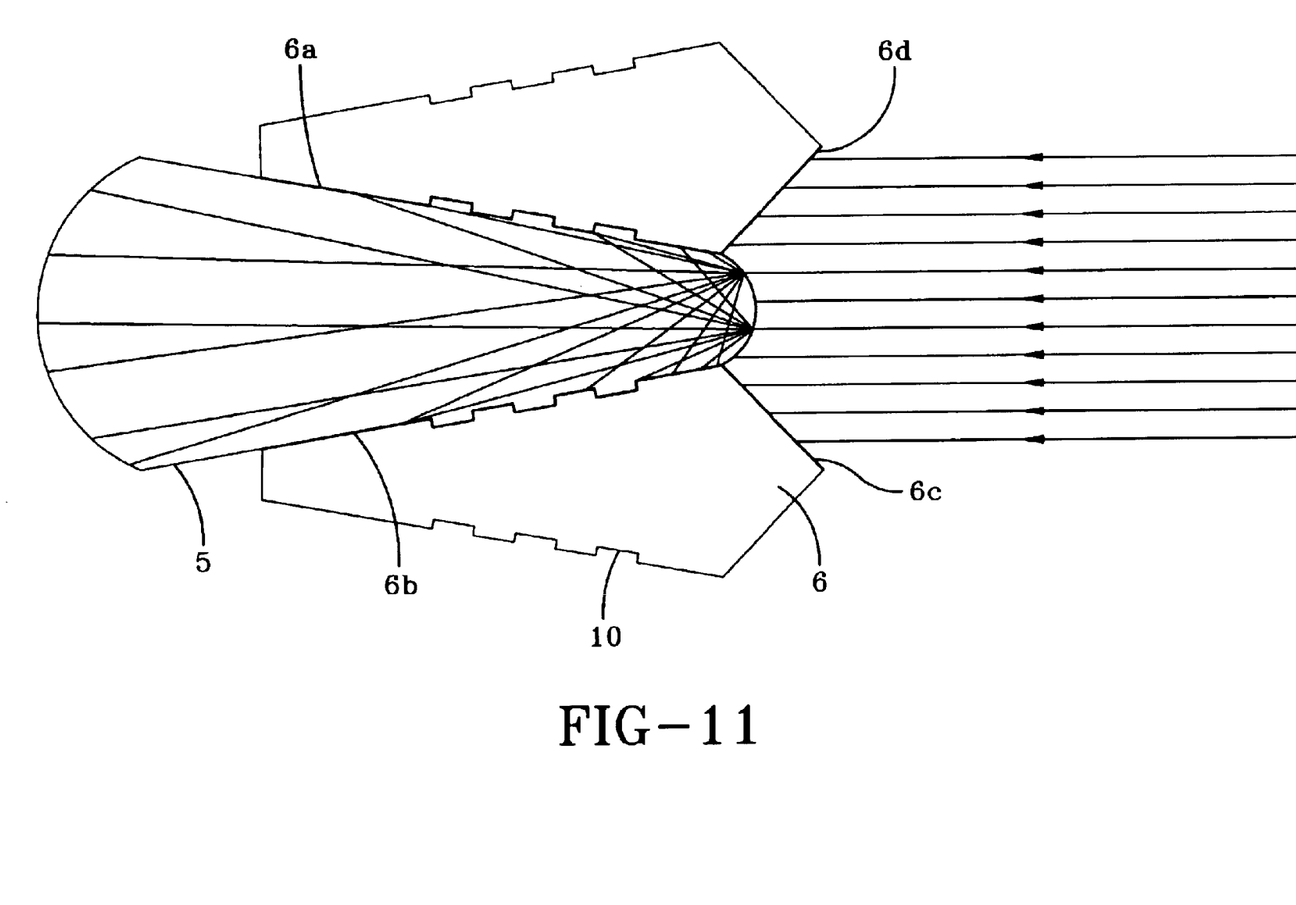
FIG. 11 is a schematic of the sides of the reinforced member which can absorb ambient lights.
Figure 12:
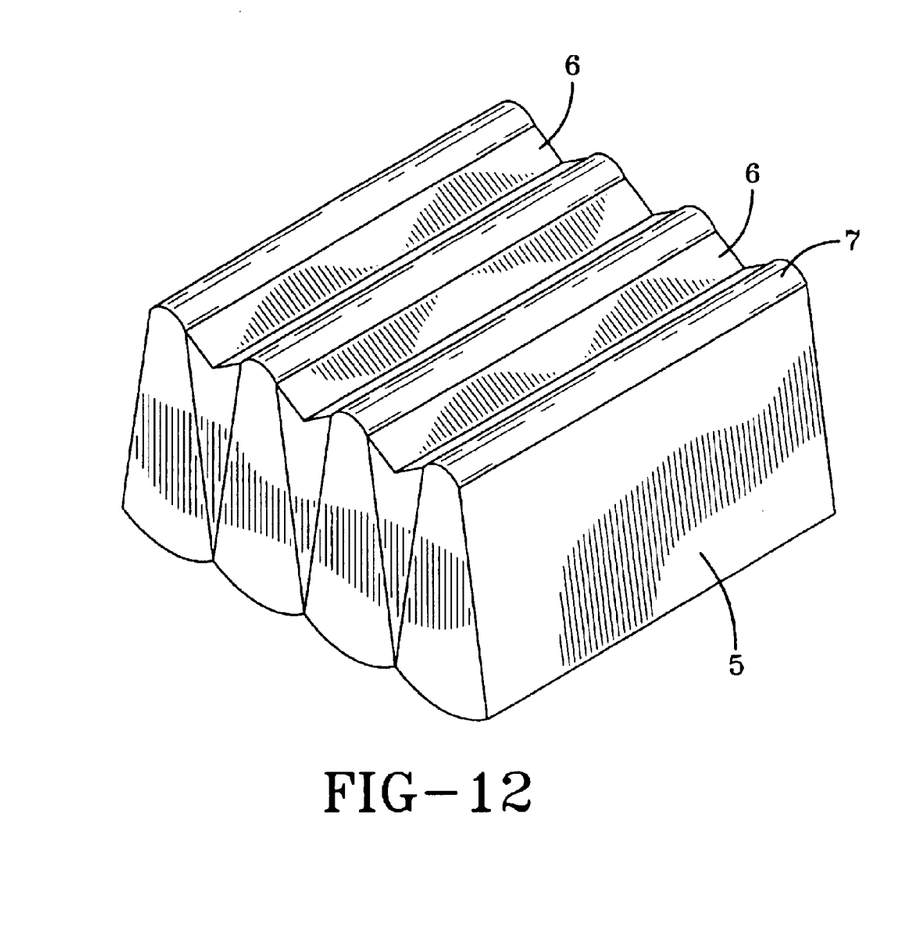
FIG. 12 is a perspective view of an alternative embodiment of the cylindrical lens array, showing the reinforced member in the shape of a "Y," of the screen shown in FIG. 1.
Figure 13:
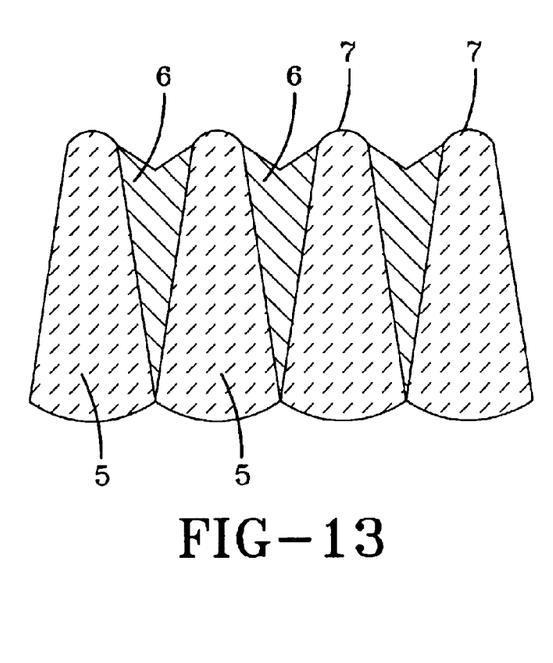
FIG. 13 is a cross-sectional view of the cylindrical lens array shown in FIG. 12.
Figure 14:
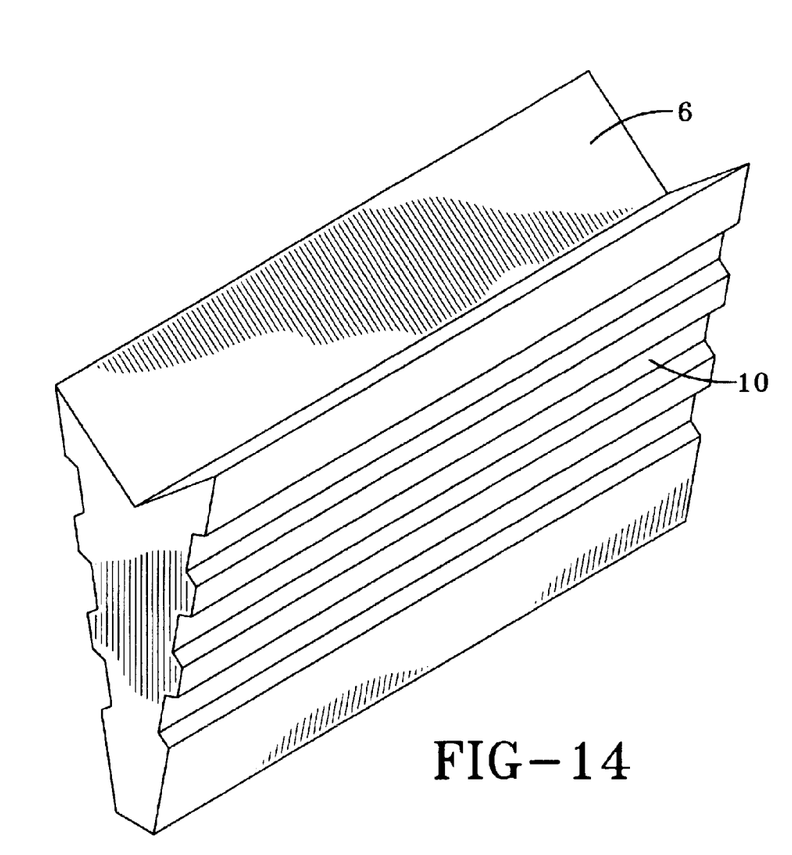
FIG. 14 is a perspective view of the reinforced member of the cylindrical lens array shown in FIG. 12.
Figure 15:
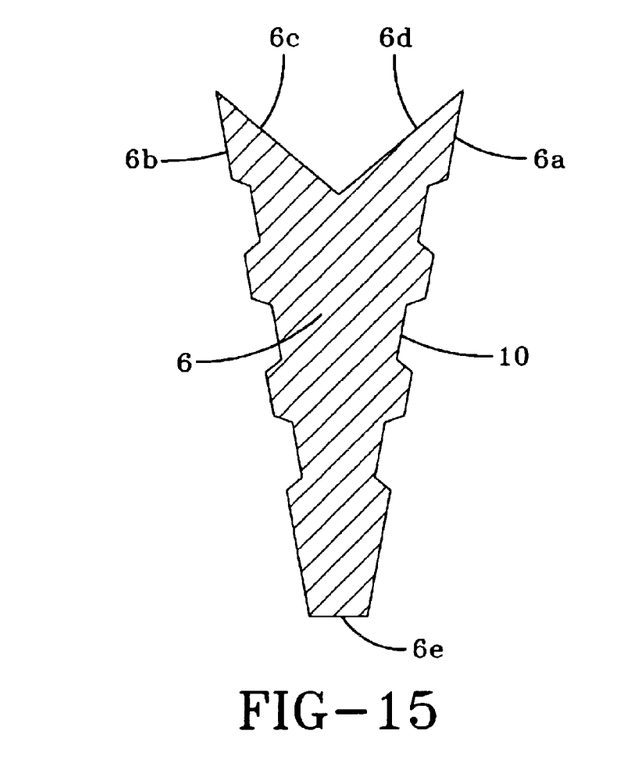
FIG. 15 is a cross-sectional view of the reinforced member shown in FIG. 14.
Figure 16:
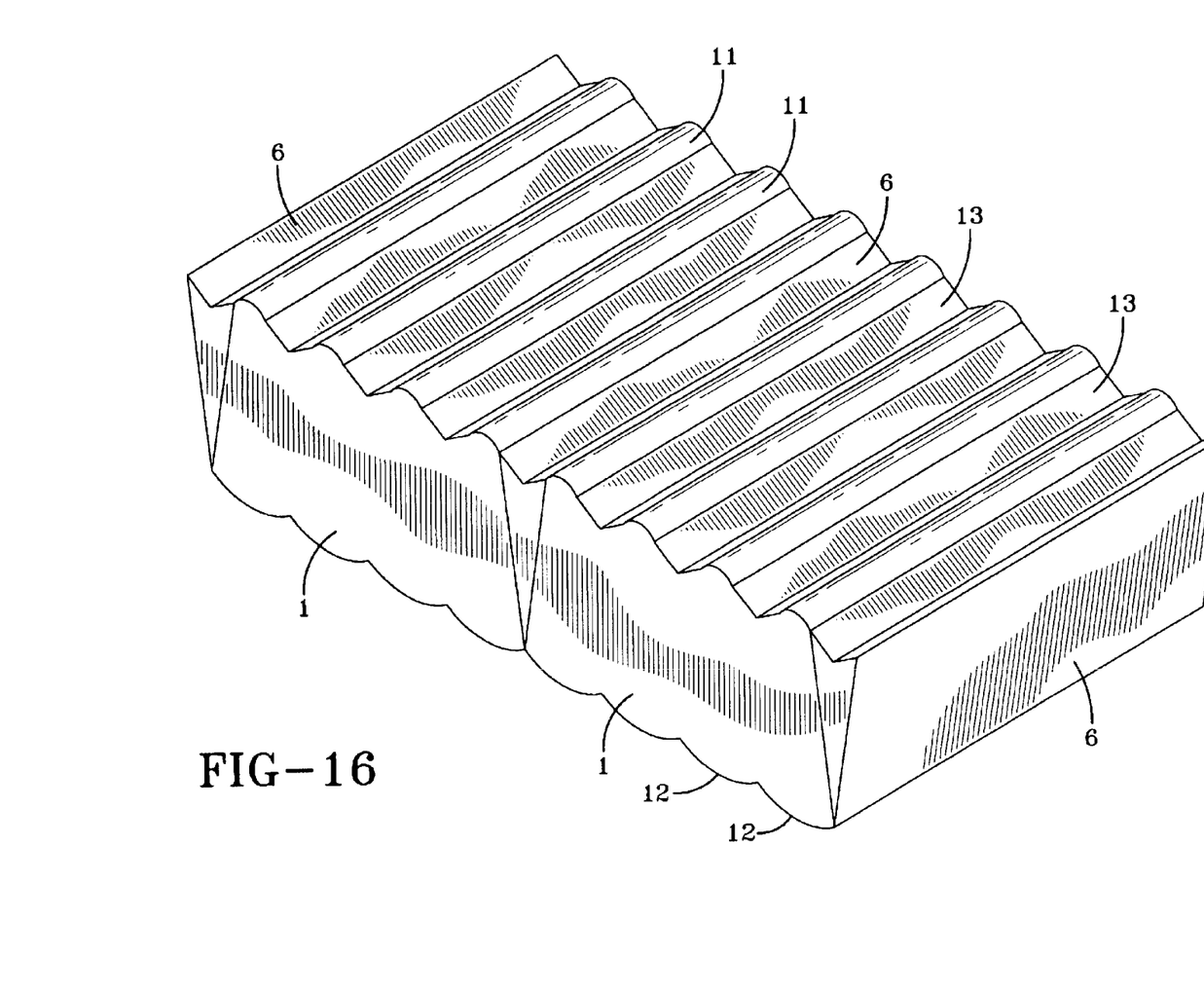
FIG. 16 is a perspective view of the alternative embodiment of the cylindrical lens array shown in FIG. 8, but showing the reinforced member in the shape of a "Y."
Figures 17, 18:
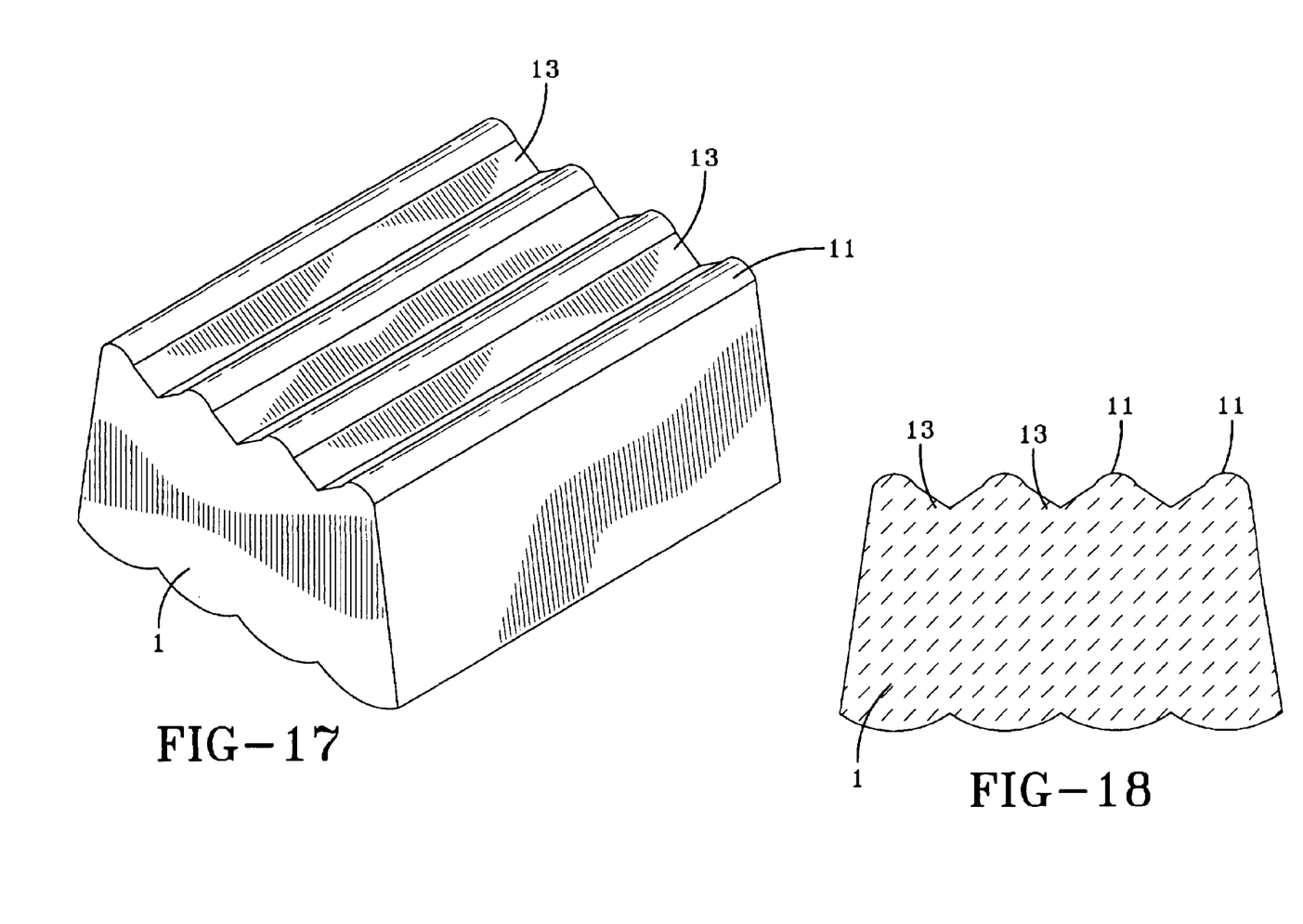
FIG. 17 is a perspective view of the cylindrical lens elements which constitute the cylindrical lens array shown in FIG. 16.
FIG. 18 is a cross-sectional view of the cylindrical lens elements shown in FIG. 17.
Figure 19:
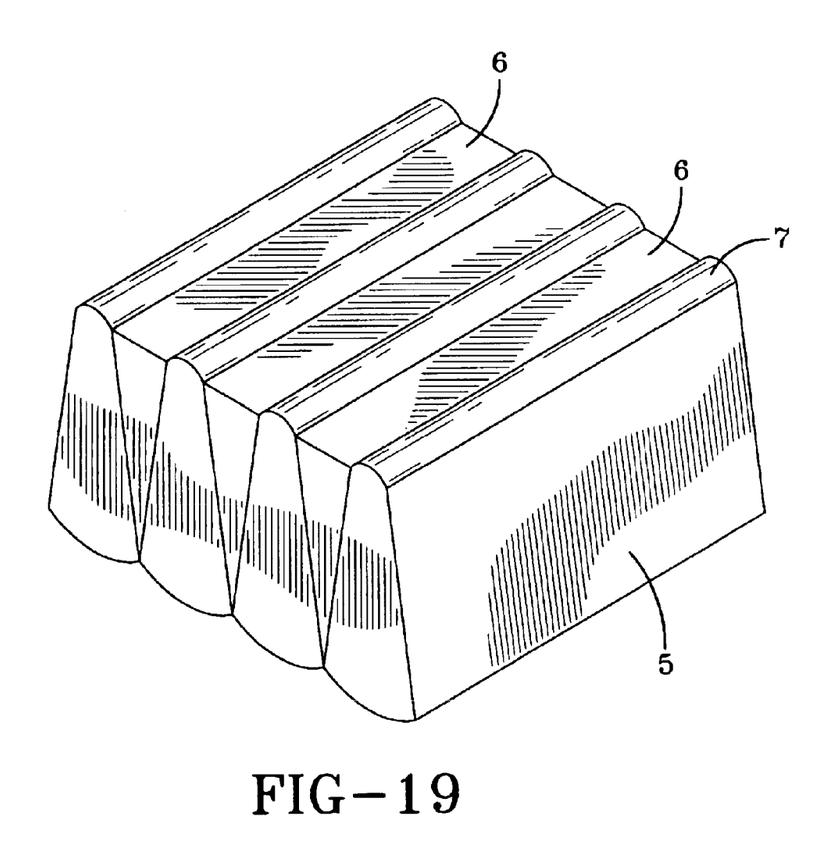
FIG. 19 is a perspective view of another alternative embodiment of the cylindrical lens array, showing the reinforced member in the shape of a "T," of the screen shown in FIG. 1.
Figure 20:
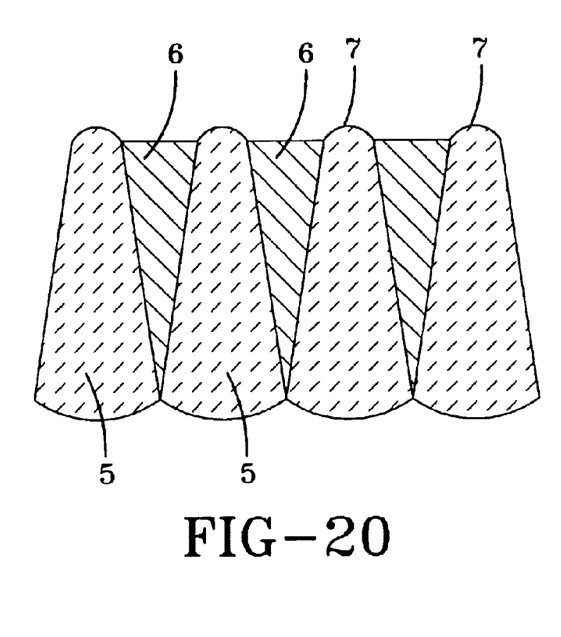
FIG. 20 is a cross-sectional view of the cylindrical lens array shown in FIG. 19.
Figure 21:
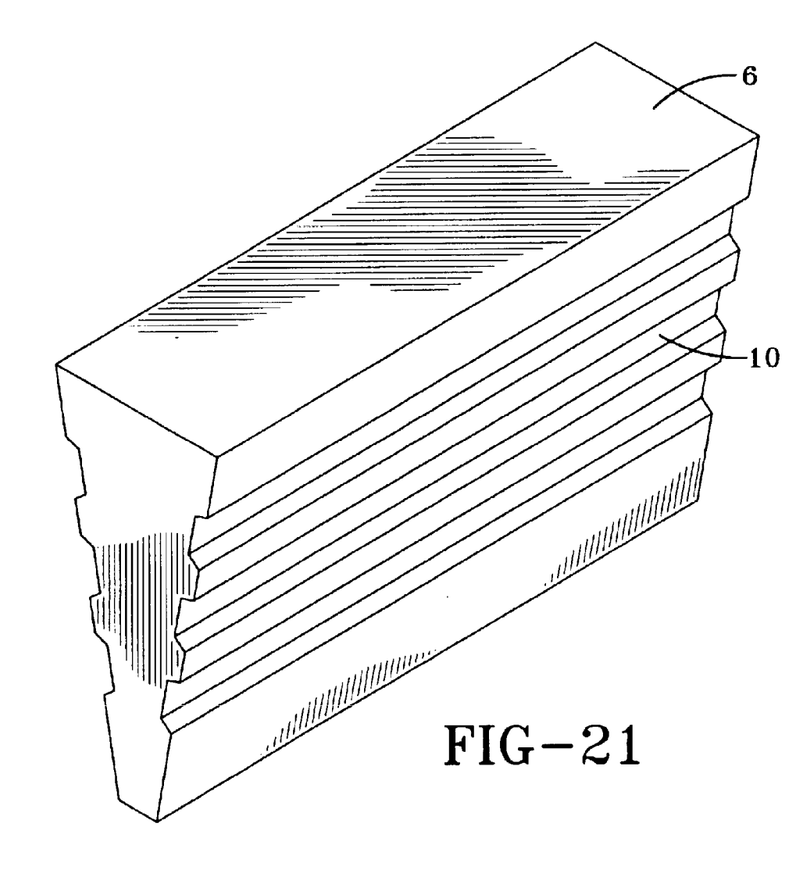
FIG. 21 is a perspective view of the reinforced member of the cylindrical lens array shown in FIG. 19.
Figure 22:
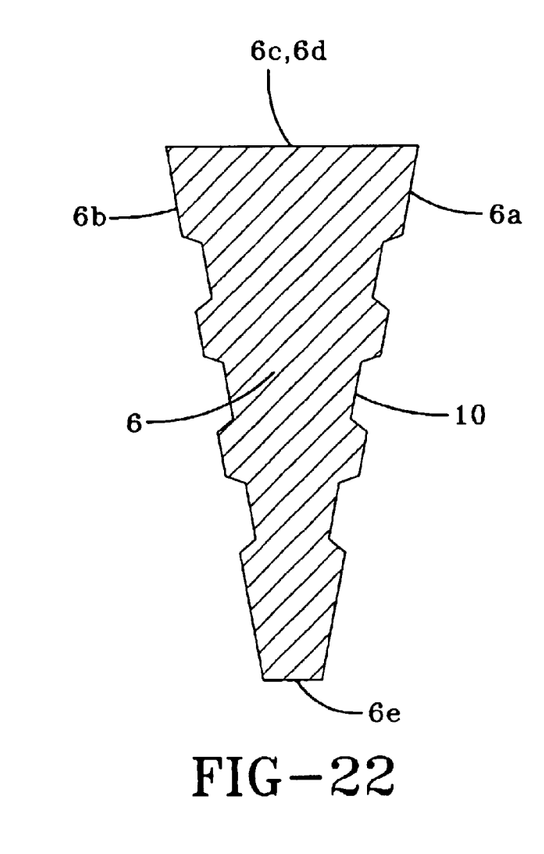
FIG. 22 is a cross-sectional view of the reinforced member shown in FIG. 21.
Figure 23:
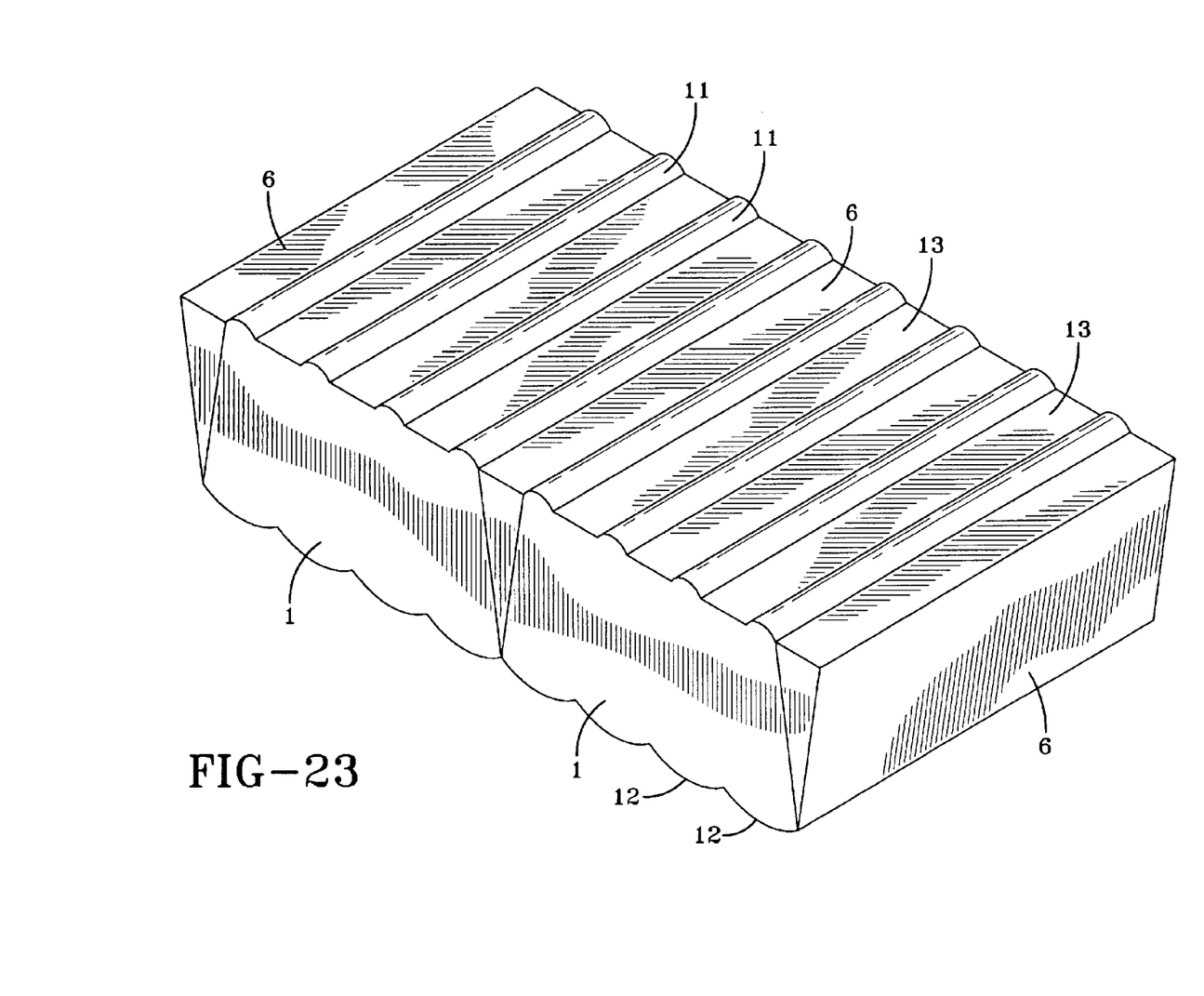
FIG. 23 is a perspective view of the alternative embodiment of the cylindrical lens array shown in FIG. 8, but showing the reinforced member in the shape of a FIG. 24 is a perspective view of the cylindrical lens elements which constitute the cylindrical lens array shown in FIG. 23.
Figure 24:
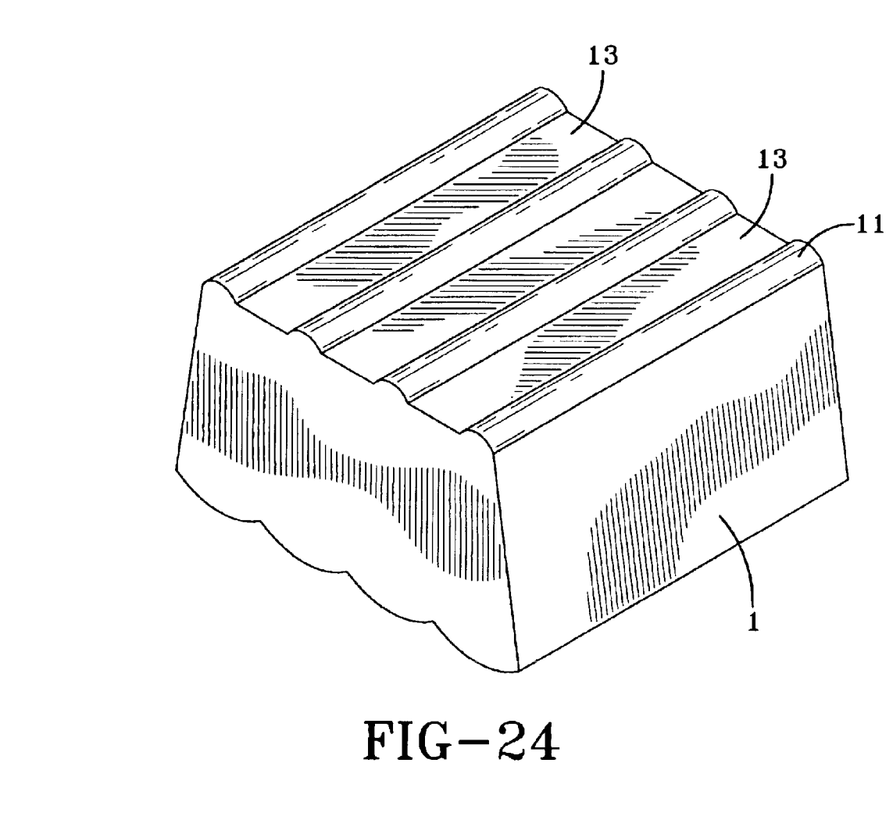
Figure 25:
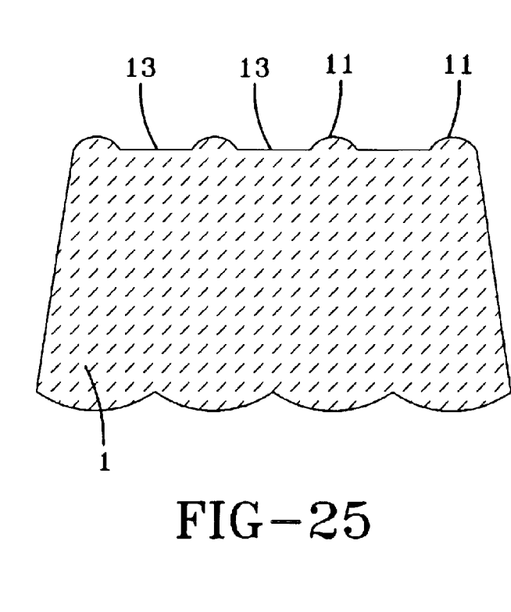
FIG. 25 is a cross-sectional view of the cylindrical lens elements shown in FIG. 24.

As shown in FIG. 11, a rigid reinforced member 6 is provided to connect with the both sides of the independent basic cylindrical lens 5 of the cylindrical lens element shown in FIG. 2. A plurality of concave portions 10 are formed in the two inclined side planes 6a and 6b of the rigid reinforced member 6. A black light absorbing layer is formed on two inclined planes 6c and 6d and the two inclined side planes 6a and 6b. So with respect to the out side of the single basic cylindrical lens 5, a part of ambient light firstly is absorbed by the front inclined plane 6c and 6d, the other part of the light then is absorbed by the corresponding inclined side planes 6a and 6b at the both sides after it pass through the front diffused transmission part of the basic cylindrical lens 5.

While preferred embodiments of the present invention have been disclosed, it will be appreciated that it is not limited thereto but may be otherwise embodied within the scope of the following claims.

I claim:

1. A kind of rear projection screen, which includes:

A Fresnel lens for collecting the image incident light;

A cylindrical lens array for receiving the image light collected by the said Fresnel lens, and an ambient light absorbing portion and image light diffused transmission part formed at the image-light exit side;

Wherein the said cylindrical lens array comprises a plurality of cylindrical lens elements, these cylindrical lens elements are in parallel and separated from each other, that is independent, and the adjacent cylindrical lens elements are arranged closely, so that there are no luminous flux loss therebetween; a strengthening area, which is provided with a rigid reinforced member connecting with cylindrical lens elements on two sides thereof, is formed on the area being from their contact portion to the image-light exit-side surface between adjacent cylindrical lens elements; an ambient light absorbing portion is formed on the image-light exit side in the strengthening area.

2. The screen of claim 1 wherein the said each cylindrical lens elements can be formed by a plurality of integrated basic cylindrical lenses whose axial plane keep in parallel.

3. The screen of claim 1 wherein the said each cylindrical lens elements can be formed by a single basic cylindrical lens.

4. The screen of claim 3 wherein the ambient light absorbing portions are provided at the sides adjacent to cylindrical lens elements of both sides in the strengthening area.

5. The screen of claim 1 wherein the said cylindrical lens elements can be assembled with two kinds of cylindrical lens elements, the first kind of cylindrical lens elements are formed by many integrated basic cylindrical lenses whose axial plane keep in parallel, the second kind of cylindrical lens elements are formed by single basic cylindrical lens.

6. The screen of claim 5 wherein the said first and second kind of cylindrical lens elements can be arranged in a manner that one or more second kind of cylindrical lens element(s) is/are provided between two first kind of cylindrical lens elements.

7. The screen of claim 5 wherein the said first and second kind of cylindrical lens elements can be arranged in a manner that one or more the first kind of cylindrical lens element(s) is/are provided between two second kind of cylindrical lens elements.

8. The screen of claim 1 wherein the said rigid reinforced members can be the shape of "Y" or "T", wherein two front wings are positioned at the image-light exit side, and the screen is provided with a outer frame which is connected with the two ends of the reinforced members.

9. The screen of claim 1 wherein the cross section of the said reinforced members can be of polygonal wherein one of angles protrudes toward the direction of image-light exiting.

10. The screen of claim 1 wherein the said reinforced members can be made from rigid materials, at the image-light exit side, a black oxide layer or black overcoating layer is provided.

11. The screen of claim 10 wherein the said rigid material can be metal, carbon fiber or non-metal material with high rigidity.

12. The screen of claim 1 wherein the said reinforced members and the corresponding cylindrical lenses of both sides can be jointed by engaging a tenon with a mortice.

13. The screen of claim 1 wherein the said reinforced members and the corresponding cylindrical lenses of both sides can be jointed by bond.

14. The screen of claim 1 wherein the said ambient light absorbing portion in the strengthening area can be formed by black reinforced members themselves which absorb the ambient light.

15. The screen of claim 1 wherein the said ambient light absorbing portion of the strengthening area can be made from light absorbing packing which stuff the area.

16. The screen of claim 1 wherein the said Fresnel lens is made of two overlapped lenses with straight Fresnel stripes, and the extending direction of the straight Fresnel stripes of the two lenses keep at right angles each other.

* * * * *